(12) United States Patent
Maris

(10) Patent No.: US 7,062,364 B2
(45) Date of Patent: Jun. 13, 2006

(54) ELECTRONIC NON-LINEAR AIRCRAFT DYNAMIC PARAMETER DISPLAY

(75) Inventor: John Maris, St-Bruno (CA)

(73) Assignee: Marivent Corporation, St-Bruno-de-Montarville (CA)

( * ) Notice: Subject to any disclaimer, the term of this patent is extended or adjusted under 35 U.S.C. 154(b) by 37 days.

(21) Appl. No.: 10/670,780

(22) Filed: Sep. 26, 2003

(65) Prior Publication Data

US 2004/0113816 A1    Jun. 17, 2004

Related U.S. Application Data

(60) Provisional application No. 60/415,807, filed on Oct. 4, 2002.

(51) Int. Cl.
*G01C 23/00* (2006.01)

(52) U.S. Cl. .............. 701/14; 701/3; 701/4; 701/7; 340/945; 340/971; 340/973; 340/974; 340/977; 340/978; 244/1 R

(58) Field of Classification Search ............ 701/3, 701/4, 7, 14; 244/1 R; 340/945, 971, 973, 340/977, 978
See application file for complete search history.

(56) References Cited

U.S. PATENT DOCUMENTS

| | | | |
|---|---|---|---|
| 3,747,409 A * | 7/1973 | Argentieri ................ 73/387 |
| 3,806,934 A * | 4/1974 | Hays, Jr. ................ 342/411 |
| 4,495,806 A * | 1/1985 | Jones ..................... 73/182 |
| 4,539,843 A | 9/1985 | Wise | |
| 4,860,007 A | 8/1989 | Konicke et al. | |
| 5,136,301 A | 8/1992 | Bechtold et al. | |
| 5,250,947 A | 10/1993 | Worden et al. | |
| 5,289,185 A | 2/1994 | Ramier | |
| 5,396,425 A | 3/1995 | Carlson | |
| 5,412,382 A | 5/1995 | Leard et al. | |
| 5,438,880 A * | 8/1995 | Washburn ................ 73/861.65 |
| 5,614,897 A | 3/1997 | Durnford | |
| 5,719,581 A | 2/1998 | Poe | |
| 5,745,863 A | 4/1998 | Uhlenhop et al. | |
| 5,844,504 A | 12/1998 | Etherington | |
| 6,057,786 A | 5/2000 | Briffe et al. | |
| 6,112,141 A | 8/2000 | Briffe et al. | |
| 6,150,960 A | 11/2000 | Voulgaris | |
| 6,154,151 A | 11/2000 | McElreath et al. | |
| 6,232,890 B1 | 5/2001 | Berlioz et al. | |
| 6,259,378 B1 | 7/2001 | Block | |
| 6,381,519 B1 | 4/2002 | Snyder | |
| 6,400,283 B1 | 6/2002 | Berlioz et al. | |
| 6,405,107 B1 | 6/2002 | Derman | |
| 6,441,751 B1 * | 8/2002 | Berlioz et al. ............ 340/977 |
| 6,567,014 B1 * | 5/2003 | Hansen et al. ............ 340/980 |
| 2002/0089432 A1 | 7/2002 | Staggs et al. | |

FOREIGN PATENT DOCUMENTS

| DE | 27 24 860 | 8/1978 |
|---|---|---|
| WO | WO 02/07094 A | 1/2002 |

* cited by examiner

*Primary Examiner*—Thomas G. Black
*Assistant Examiner*—Eric M Gibson
(74) *Attorney, Agent, or Firm*—Ogilvy Renault

(57) ABSTRACT

A method and apparatus is disclosed for displaying a dynamic parameter of an aircraft, the apparatus comprises a display unit receiving a display signal and displaying a scale that changes dynamically and non-linearly in accordance with a selected display algorithm, the display unit further displaying a pointer pointing to said scale in accordance with a reading of said dynamic parameter, thereby emphasizing a range of said reading of said dynamic parameter.

26 Claims, 15 Drawing Sheets

ELECTRONIC NON-LINEAR AIRCRAFT DYNAMIC PARAMETER DISPLAY

CROSS-REFERENCE TO RELATED APPLICATIONS

This patent application claims priority of U.S. provisional patent application No. 60/415,807, entitled "Electronic non-linear aircraft altitude and vertical speed display", which was filed on Oct. 4, 2002, the specification of which is herewith enclosed by reference.

TECHNICAL FIELD

This invention relates to the field of aircraft instruments. More precisely, this invention relates to aircraft dynamic parameter displays.

BACKGROUND OF THE INVENTION

Measurement and displaying of dynamic parameters of an aircraft is a key issue for properly controlling, managing and validating aircraft position and velocity.

It is known that measurement of aircraft altitude and vertical speed, by barometric and other means, is a mature technology which is founded on principles which have remained relatively unchanged since the first deployment of altimeters and vertical speed indicators (VSI).

In contrast, the "modern" altimeter display has evolved through four distinct iterations.

An earliest modern variant, the "three-pointer" consists of a circular analog display housing three concentric pointers read against a common scale. A pointer is dedicated for displaying each of the 100's, 1,000s and 10,000s feet as shown in FIG. 1a. This format is difficult to interpret, particularly during dynamic situations. Use of this technology resulted in several aircraft accidents because the small 10,000 ft pointer is easily obscured by larger pointers, leading to interpretation errors of multiples of 10,000 ft. This tendency became unacceptable with the advent of jet aircraft, whose high rates of climb and descent rendered the three-pointer altimeter virtually useless. It will be appreciated by someone skilled in the art that the three-pointer altimeter is still in widespread use in low-performance general aviation aircraft.

A second generation of mechanical altimeters, the "counter-pointer" altimeter, is a refinement of the "three-pointer" altimeter which comprises a single 100 ft pointer, sweeping over a circular scale, with an additional digital display of altitude presented on a drum or counter on the face of the instrument as shown in FIG. 1b.

Although the details of the digital display, such as its smallest digital altitude increment, vary between different embodiments, the principle remains unaltered. The main benefits of the "counter-pointer" altimeter include its ease of interpretation and elimination of the 10,000 ft interpretation error potential.

A third generation of altimeters comprises a moving vertical altitude tape read against a central stationary pointer, as shown in FIG. 2. The instrument typically includes a digital readout of the aircraft altitude adjacent to the tape display. Refinements to this system include provision of a vertical speed display adjacent to the altitude scale, and which allows the pilot to monitor altitude and vertical speed simultaneously, with a minimum of eye movement.

A current generation of altimeters reflects a transition from mechanical instruments to Electronic Flight Instrument Systems (EFIS) and Head-up Displays (HUD). Such systems have allowed the altitude display indications to be decoupled from any "physical" altimeter instrument, thereby allowing incorporation of new display formats.

Modern altimeter formats described above have several important disadvantages.

Except at very low altitudes, there is no analog representation of the aircraft's altitude above the altitude reference datum which is typically mean sea-level (MSL). This is because at high altitudes, neither the counter pointer nor the tape altimeter can show the zero-altitude datum, because of the scaling compromise between adequate resolution and adequate range. In other words, the analog part of these altimeters can only display a relatively narrow altitude band around the aircraft's current altitude, which typically does not include the zero point. This is an important drawback, because it has been contemplated that humans are much better at evaluating rates of change of analog data (e.g. pointers) than digital data, and the simultaneous display of the zero datum and the reference datum is critical, particularly in very dynamic situations. Traditional implementations have been unable to display the altitude information in the preferred analog fashion, while simultaneously displaying both the zero datum and current altitude.

Furthermore, the resolution of the mechanical altimeters is generally fixed at all altitudes, even though flight operations may require differing resolutions for different circumstances (e.g. higher resolution is desirable at low altitudes, where terrain clearance is most critical).

With respect to aircraft airspeed, it is known that measurement of the aircraft airspeed, by pitot-static means, is also known as a very mature technology which is founded on principles which have remained largely unchanged since the deployment of the first airspeed indicators (ASI). Modern airspeed indicators takes one of two forms: a dial/pointer display, occasionally supplemented with a digital counter and the fixed pointer/moving tape display typically incorporated in Electronic Flight Instrument Systems (EFIS) and Head-Up Display (HUD), as shown in FIG. 3. Both of these formats share an important disadvantage, they use a fixed scale which requires a tradeoff between resolution and scale range. In other words, a large scale is more legible, but has a relatively small display range, whereas a smaller scale achieves good range while compromising legibility.

There is therefore a need for a method and apparatus that will overcome the above-identified drawbacks.

SUMMARY OF THE INVENTION

It is an object of the invention to provide an apparatus for displaying an aircraft dynamic parameter in using a flexible dynamic parameter scale.

It is another object of the invention to provide a method for displaying an aircraft dynamic parameter using a flexible dynamic parameter scale.

Yet another object of the invention is to provide an apparatus for displaying a measured altitude signal of an aircraft together with a flexible altitude scale.

Yet another object of the invention is to provide an apparatus for displaying a measured airspeed signal of an aircraft together with a flexible speed scale.

Yet another object of the invention is to provide an apparatus for displaying a vertical airspeed value of an aircraft.

According to a first aspect of the invention there is provided an apparatus for displaying a dynamic parameter of an aircraft, the apparatus comprising a processing unit receiving a selected display algorithm signal and a reading of the dynamic parameter, the processing unit determining a display signal and a display unit receiving the display signal and displaying a scale that changes dynamically and non-linearly in accordance with the selected display algorithm, the display unit further displaying a pointer pointing to the scale in accordance with the reading of the dynamic parameter, thereby emphasizing a range of the reading of the dynamic parameter.

According to another aspect of the invention there is provided a method for displaying a dynamic parameter of an aircraft, the method comprising providing a reading of the dynamic parameter, generating a scale that changes dynamically and non-linearly using the provided reading of the dynamic parameter, and a selected display algorithm signal and a pointer pointing to the scale in accordance with the reading of the dynamic parameter of the aircraft and displaying the scale with the pointer thereby emphasizing a range of the reading of the dynamic parameter.

According to another aspect of the invention, there is provided an apparatus for displaying a dynamic parameter of an aircraft, the apparatus comprising a display unit receiving a display signal and displaying a scale that changes dynamically and non-linearly in accordance with a selected display algorithm, the display unit further displaying a pointer pointing to the scale in accordance with a reading of the dynamic parameter, thereby emphasizing a range of the reading of the dynamic parameter.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Figure 1A:
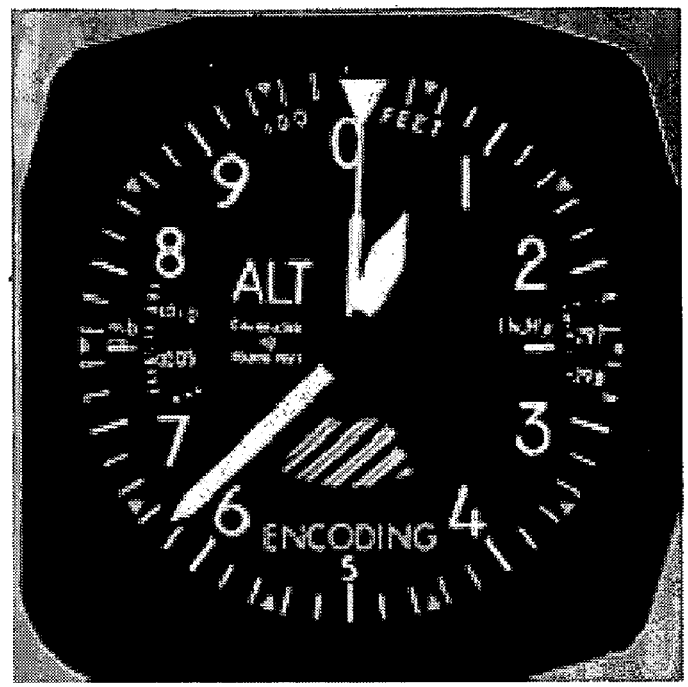
FIG. 1a is a front view of a "three-pointer" prior art altimeter; it will be appreciated that efforts are required to synthesize the readings of the three pointers into a coherent altitude; furthermore it will be appreciated that the small 10,000 ft pointer may be occluded by a larger one.
Figure 1B:
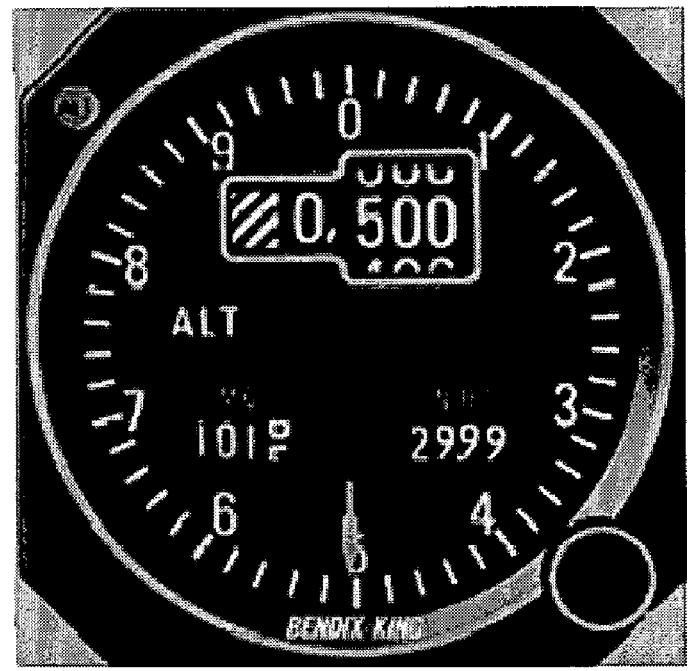
FIG. 1b is a front view of a "counter pointer" prior art altimeter.
Figure 2:
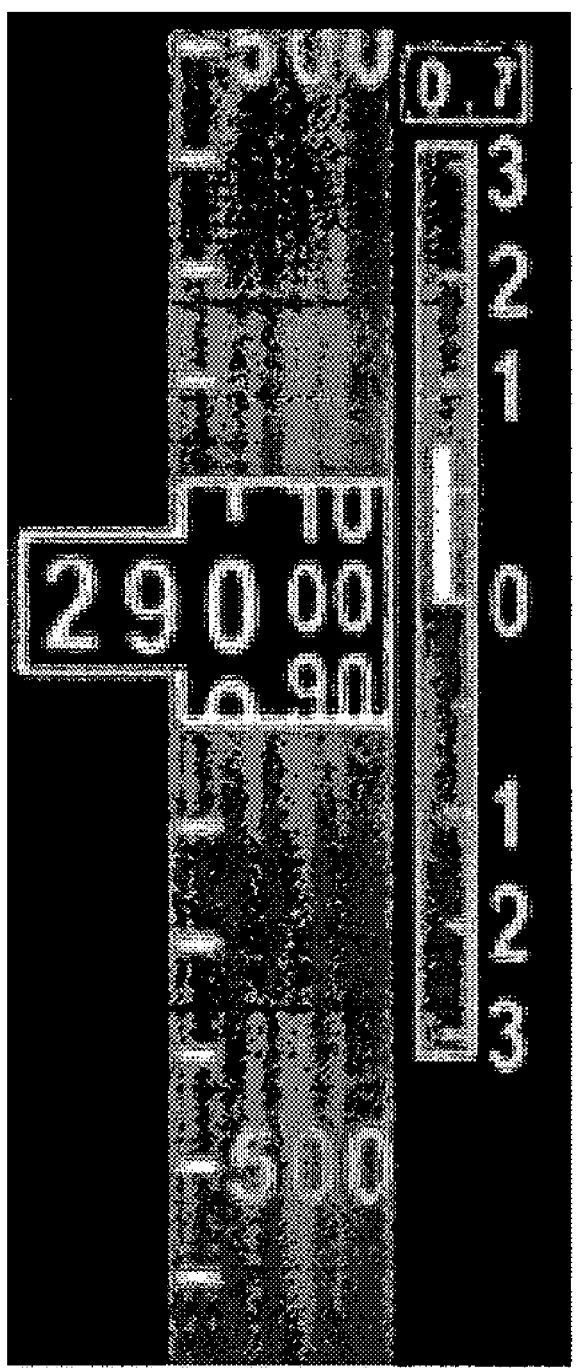
FIG. 2 is a front view of a prior art embodiment of a tape altimeter; someone skilled in the art will appreciate the absence of a zero, mean sea level or ground plane reference datum due to the small portion of the hypothetical "tape" which is visible due to scale constraints.
Figure 3:
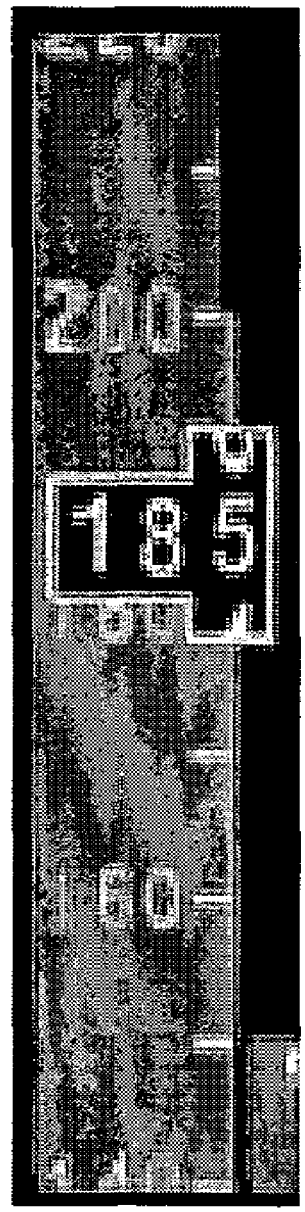
FIG. 3 is a front view of a fixed pointer/moving tape prior art display typically incorporated in Electronic Flight Instrument Systems (EFIS) and Head-Up Display (HUD)
Figure 4:
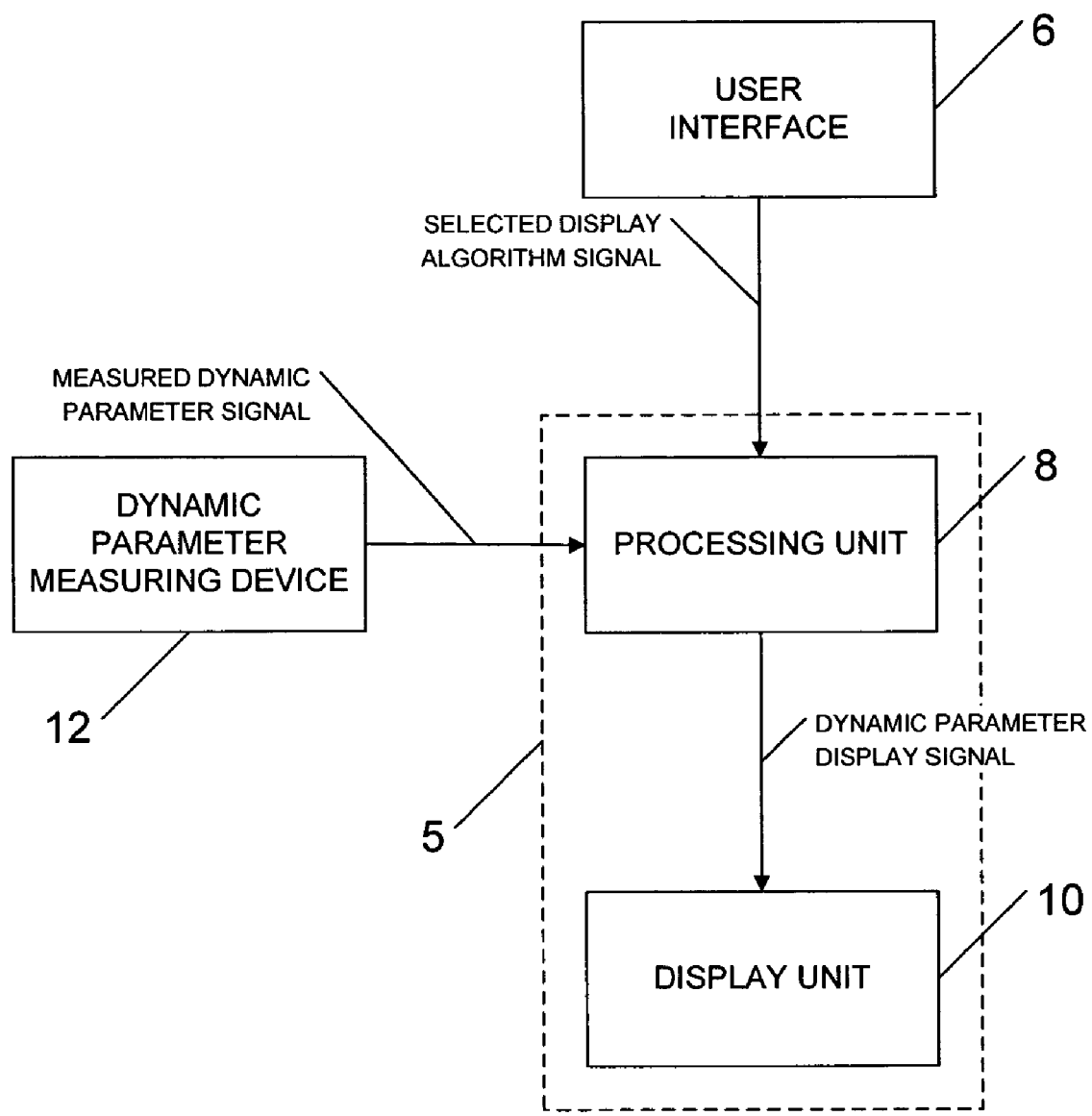
FIG. 4 is a block diagram of an electronic non-linear aircraft dynamic parameter display comprising a processing unit and a display unit in accordance with a preferred embodiment of the invention.

Now referring to FIG. 4, there is shown a preferred embodiment of an electronic non-linear aircraft dynamic parameter display 5.

The electronic non-linear aircraft dynamic parameter display 5 comprises a processing unit 8 and a display unit 10. In a preferred embodiment of the invention, the processing unit 8 is a digital computer or microprocessor, while the display unit 10 is either an Electronic Flight Instrument System (EFIS), a Multifunction Display (MFD), or a Head-Up Display (HUD), all of which are well known to someone versed in the art.

The processing unit 8 receives a selected display algorithm signal provided by a user interface 6 and a measured dynamic parameter signal provided by a dynamic parameter measuring device 12.

The processing unit 8 provides a dynamic parameter display signal to the display unit 10.

Figure 5:
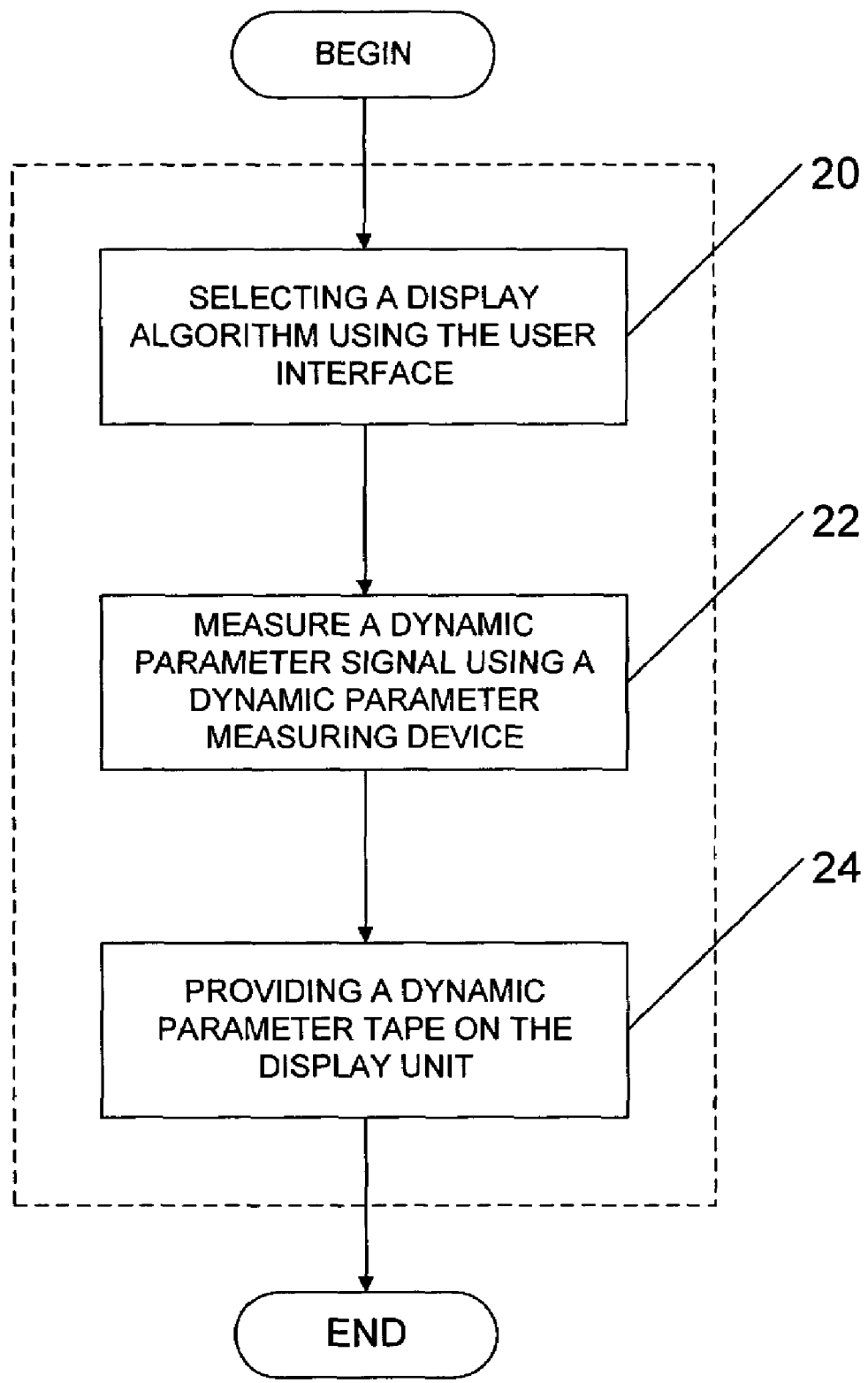
FIG. 5 is a flowchart which shows how the electronic non-linear aircraft dynamic parameter display operates in the preferred embodiment of the invention.

Now referring to FIG. 5, there is shown how the electronic non-linear aircraft dynamic parameter display 5 operates in a preferred embodiment of the invention.

According to step 20, a display algorithm is selected using the user interface 6. The selected display algorithm signal is provided by the user interface 6 to the processing unit 8. In one embodiment, the display algorithm is selected by a pilot of the aircraft while in another embodiment of the invention, the display algorithm is selected by the air-data or display computer, or the like. For simple embodiments, the display algorithm may be a fixed algorithm which is not user-selectable.

According to step 22, a dynamic parameter signal is measured using the dynamic parameter measuring device 12 which provides the measured dynamic parameter signal to the processing unit 8.

According to step 24, the dynamic parameter display signal, comprising data for displaying a dynamic parameter tape on the display unit 10. Prior to displaying the dynamic parameter tape, the processing unit 8 first determines the dynamic parameter display signal using the measured dynamic parameter signal and the selected display algorithm signal and provides the created dynamic parameter display signal to the display unit 10.

Figure 6:
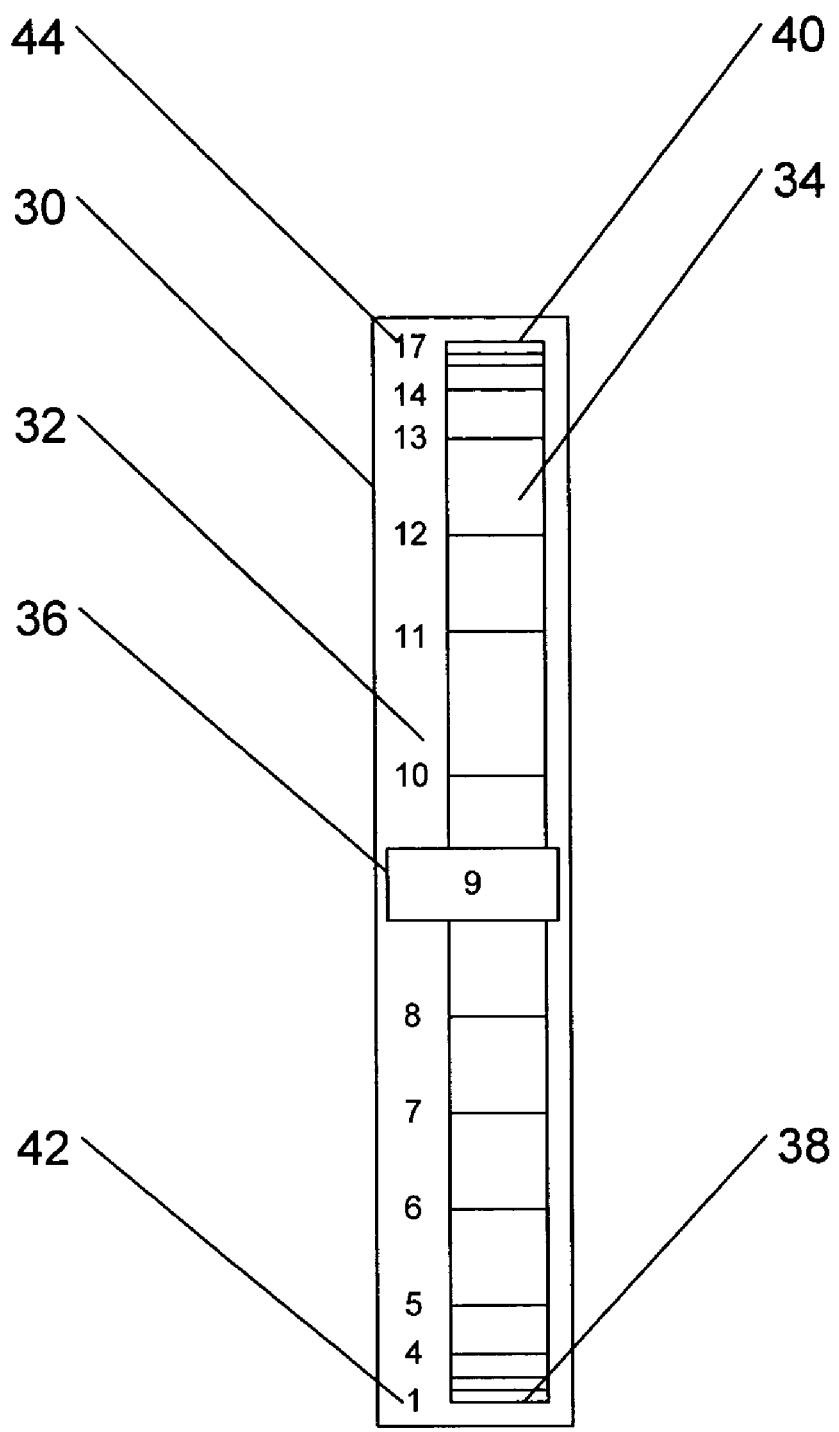
FIG. 6 is a diagram which shows a first example of a dynamic parameter tape provided on an electronic non-linear aircraft dynamic parameter display.

Now referring to FIG. 6, there is shown a first example of a dynamic parameter tape 30 provided on an electronic non-linear aircraft dynamic parameter display 10.

The dynamic parameter tape 30 comprises a dynamic non-linear dynamic parameter scale 34, a corresponding non-linear dynamic parameter value scale 32 and a pointer 36.

By convention, the dynamic non-linear dynamic parameter scale 34 and the corresponding non-linear dynamic parameter value scale 32 are displayed vertically. In alternative embodiments, the dynamic non-linear dynamic parameter scale 34 and the corresponding non-linear dynamic parameter value scale 32 may be displayed horizontally or at any other angles.

The dynamic non-linear dynamic parameter scale 34 is a dynamic parameter scale that is provided between a first dynamic parameter scale end 38 and a second dynamic parameter scale end 40.

The corresponding non-linear dynamic parameter value scale 32 comprises a plurality of corresponding dynamic parameter values and is provided between a first dynamic parameter value 42 corresponding to the first dynamic parameter scale end 38 and a second dynamic parameter value 44 corresponding to the second dynamic parameter scale end 40.

The pointer 36 is located substantially at an equal distance between end 38 and end 40 of the dynamic non-linear dynamic parameter scale 34. The pointer 36 comprises an indication of the measured dynamic parameter signal.

It will be appreciated that the dynamic non-linear dynamic parameter scale 34 is adapted according to the selected display algorithm signal. As explained below, in one embodiment, the selected display algorithm signal is an exponential factor while in another embodiment of the invention, the selected display algorithm signal is a logarithmic factor. Alternatively, the selected display algorithm signal is a geometric factor.

Furthermore, it will be appreciated that while a first part of the dynamic non-linear dynamic parameter scale 34, for example, the part above pointer 36, is adapted according to a first selected display algorithm signal, a second part of the dynamic non-linear dynamic parameter scale 34, for example, the part below pointer 36, may be adapted according to a second selected display algorithm signal.

In one embodiment, the first dynamic parameter value 42 corresponding to the first dynamic parameter scale end 38 and the second dynamic parameter value 44 corresponding to the second dynamic parameter scale end 40 are provided by the user interface 6 while in another embodiment, the first dynamic parameter value 42 and the second dynamic parameter value 44 are automatically selected.

Figure 7:
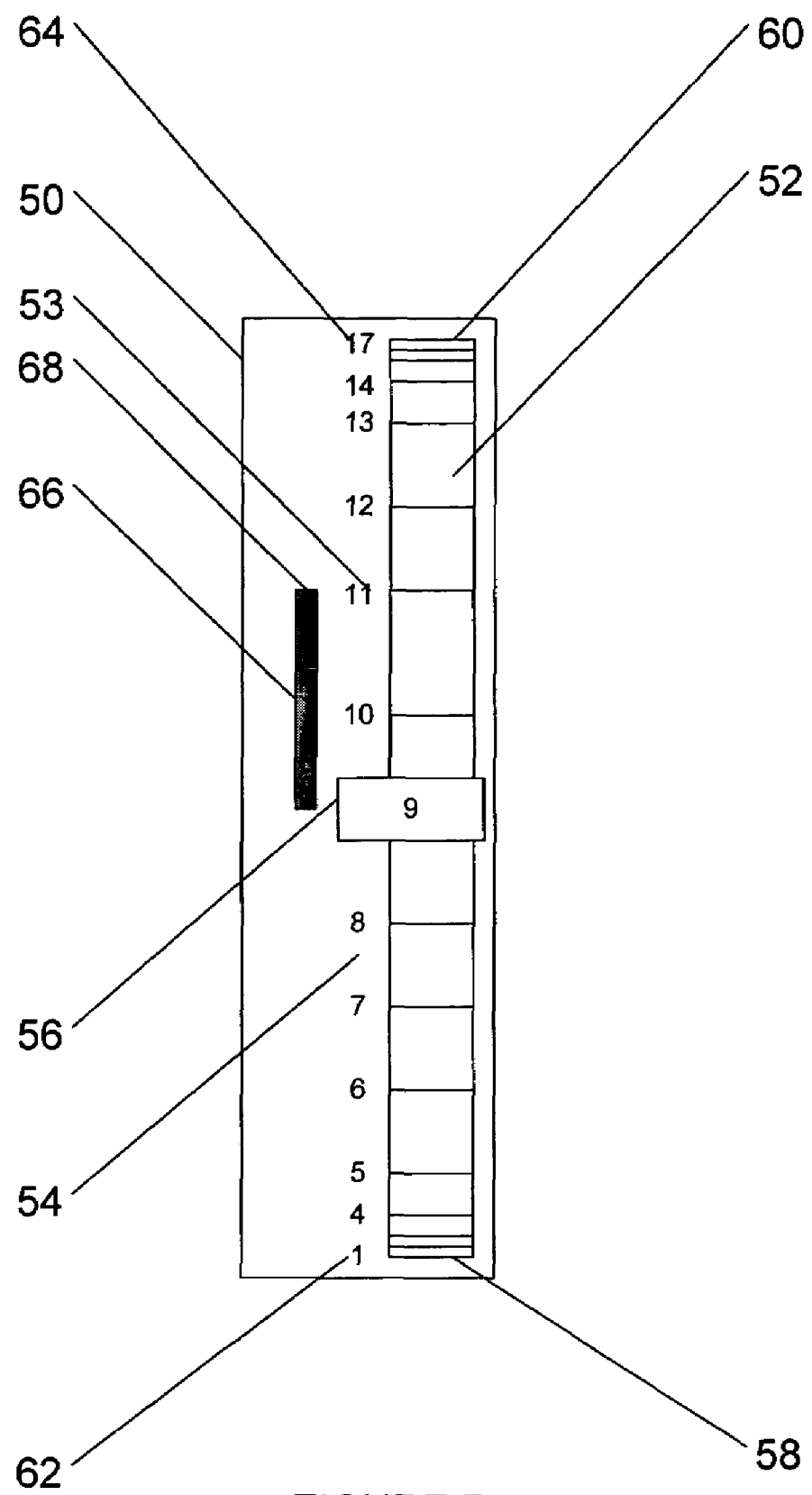
FIG. 7 is a diagram which shows a second example of the dynamic parameter tape provided on the electronic non-linear aircraft dynamic parameter display.

Now referring to FIG. 7, there is shown a second example of a dynamic parameter tape 50 provided on an electronic non-linear aircraft dynamic parameter display.

The dynamic parameter tape 50 comprises a dynamic non-linear dynamic parameter scale 52, a corresponding non-linear dynamic parameter value scale 54, a pointer 56 and an adjacent vertical bar 66.

By convention, the dynamic non-linear dynamic parameter scale 52 and the corresponding non-linear dynamic parameter value scale 54 are displayed vertically. In an alternative embodiment, the dynamic non-linear dynamic parameter scale 52 and the corresponding non-linear dynamic parameter value scale 54 may be displayed horizontally.

The dynamic non-linear dynamic parameter scale 52 comprises a dynamic parameter scale that is provided between a first dynamic parameter scale end 58 and a second dynamic parameter scale end 60.

The corresponding non-linear dynamic parameter value scale 54 comprises a plurality of corresponding dynamic parameter values and is provided between a first dynamic parameter value 62 corresponding to the first dynamic parameter scale end 58 and a second dynamic parameter value 64 corresponding to the second dynamic parameter scale end 60.

The pointer 56 is located substantially at an equal distance between end 58 and end 60 of the dynamic non-linear dynamic parameter scale 52. The pointer 56 comprises an indication of the measured dynamic parameter signal.

The adjacent vertical bar 66 is located adjacent on the corresponding non-linear dynamic parameter value scale 54. Alternatively, the adjacent vertical bar 66 is located adjacent on the dynamic non-linear dynamic parameter scale 52.

The adjacent vertical bar 66 comprises a variable end 68 which is adjacent to a corresponding future dynamic parameter value 53. The adjacent vertical bar 66 therefore provides an indication of a future dynamic parameter value if a current variation of the dynamic parameter is maintained during a predetermined amount of time.

The skilled addressee will appreciate that the corresponding future dynamic parameter value 53 can easily be seen by a pilot of the aircraft looking at the variable end 68.

It will be appreciated that the dynamic non-linear dynamic parameter scale 52 is adapted according to the selected display algorithm signal. As explained below, in one embodiment, the selected display algorithm signal is an exponential factor while in another embodiment of the invention, the selected display algorithm signal is a logarithmic factor. Alternatively, the selected display algorithm signal is a geometric factor.

Furthermore, it will be appreciated that while a first part of the dynamic non-linear dynamic parameter scale 52, for example, the part above pointer 56, is adapted according to a first selected display algorithm signal, a second part of the dynamic non-linear dynamic parameter scale 52, for example, the part below pointer 56, may be adapted according to a second selected display algorithm signal.

In one embodiment, the first dynamic parameter value 62 corresponding to the first dynamic parameter scale end 58 and the second dynamic parameter value 64 corresponding to the second dynamic parameter scale end 60 are provided by the user interface 6 while in another embodiment, the first dynamic parameter value 62 and the second dynamic parameter value 64 are automatically selected. In fact it will be appreciated that the dynamic non-linear dynamic parameter scale 52 expands from the first dynamic parameter value 62 and the second dynamic parameter value 64 toward the pointer 56.

Figure 8:
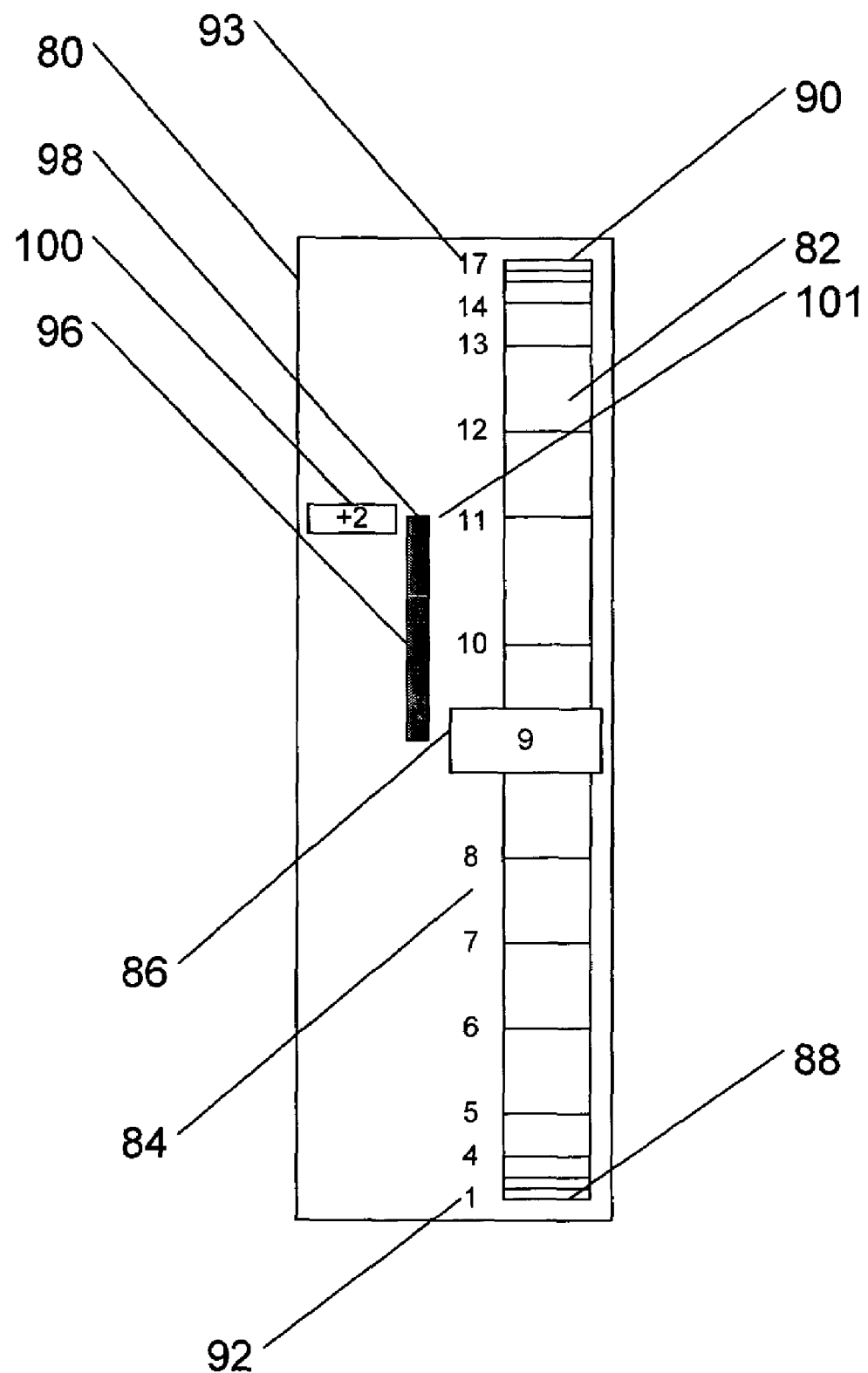
FIG. 8 is a diagram which shows a third example of the dynamic parameter tape provided on the electronic non-linear aircraft dynamic parameter display.

Now referring to FIG. 8, there is shown a third example of a dynamic parameter tape 80 provided on an electronic non-linear aircraft dynamic parameter display.

The dynamic parameter tape 80 comprises a dynamic non-linear dynamic parameter scale 82, a corresponding non-linear dynamic parameter value scale 84, a pointer 86, an adjacent vertical bar 96 and an indication of a dynamic parameter variation with respect to a predetermined amount of time 100.

By convention, the dynamic non-linear dynamic parameter scale 82 and the corresponding non-linear dynamic parameter value scale 84 are displayed vertically. In an alternative embodiment, the dynamic non-linear dynamic parameter scale 82 and the corresponding non-linear dynamic parameter value scale 84 are displayed horizontally.

The dynamic non-linear dynamic parameter scale 82 comprises a dynamic parameter scale that is provided between a first dynamic parameter scale end 88 and a second dynamic parameter scale end 90.

The corresponding non-linear dynamic parameter value scale 84 comprises a plurality of corresponding dynamic parameter values and is provided between a first dynamic parameter value 92 corresponding to the first dynamic parameter scale end 88 and a second dynamic parameter value 93 corresponding to the second dynamic parameter scale end 90.

The pointer 86 is located substantially in the middle of the dynamic non-linear dynamic parameter scale 82. The pointer 86 comprises an indication of the measured dynamic parameter signal.

The adjacent vertical bar 96 is located adjacent on the corresponding non-linear dynamic parameter value scale 84. Alternatively, the adjacent vertical bar 96 is located adjacent on the dynamic non-linear dynamic parameter scale 82.

The adjacent vertical bar 96 comprises a variable end 98 which is adjacent to a corresponding future dynamic parameter value 101. The adjacent vertical bar 96 therefore provides an indication of a future dynamic parameter value if a current variation of the dynamic parameter is maintained during a predetermined amount of time. The adjacent vertical bar 96 further comprises the indication of a dynamic parameter variation with respect to a predetermined amount of time 100.

The skilled addressee will appreciate that the corresponding future dynamic parameter value 101 can easily be seen by a pilot of the aircraft looking at the variable end 98.

It will be appreciated that the dynamic non-linear dynamic parameter scale 82 is adapted according to the selected display algorithm signal. As explained below, in one embodiment, the selected display algorithm signal is an exponential factor while in another embodiment of the invention, the selected display algorithm signal is a logarithmic factor. Alternatively, the selected display algorithm signal is a geometric factor.

Furthermore, it will be appreciated that while a first part of the dynamic non-linear dynamic parameter scale 82 is adapted according to a first selected display algorithm signal, a second part of the dynamic non-linear dynamic parameter scale 82 may be adapted according to a second selected display algorithm signal.

Figure 9:
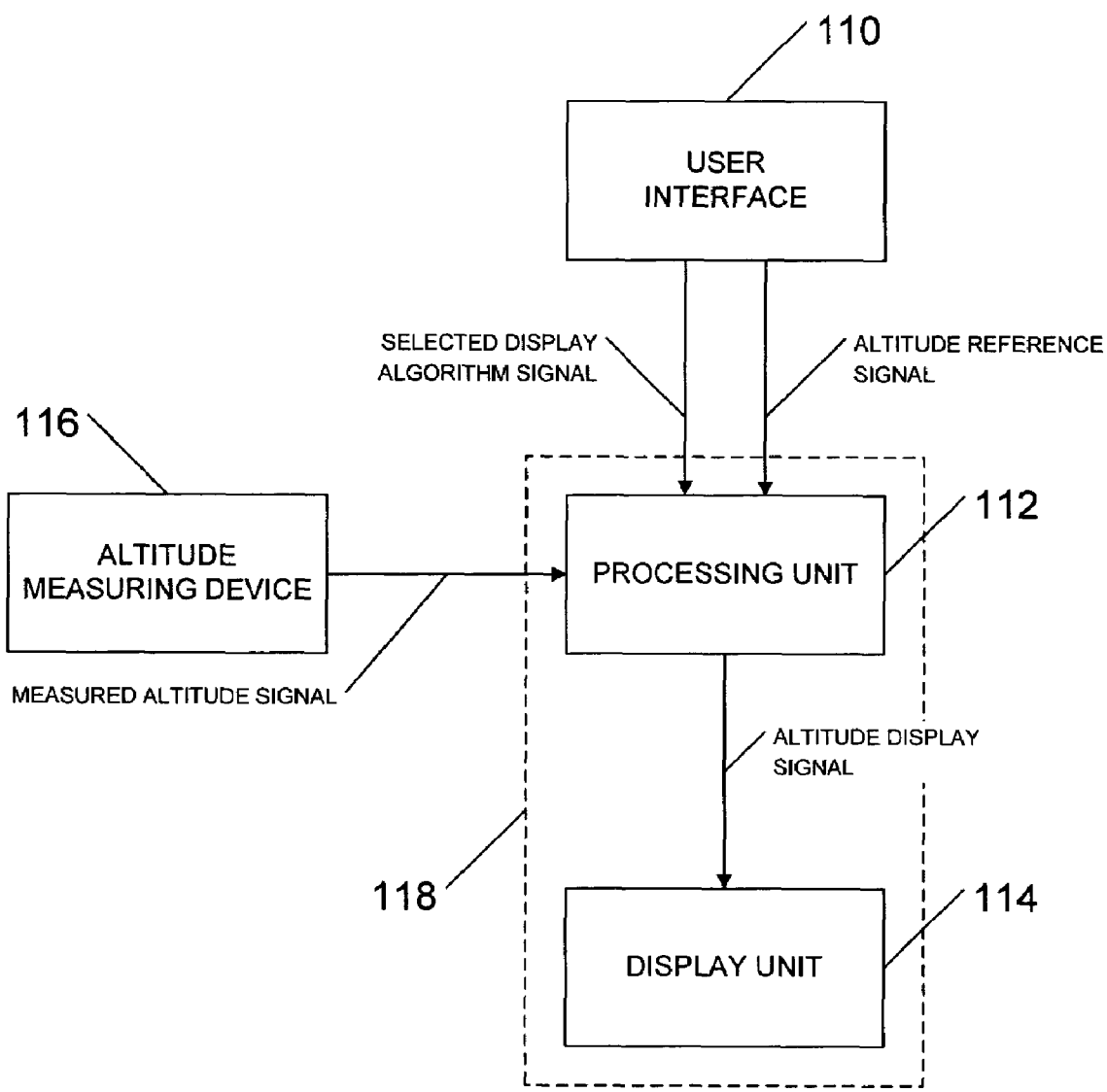
FIG. 9 is a block diagram which shows a first embodiment of the electronic non-linear aircraft dynamic parameter display where the dynamic parameter is altitude.

Now referring to FIG. 9, there is shown a block diagram which shows a first embodiment of the invention where the electronic non-linear aircraft dynamic parameter display is an electronic non-linear aircraft altimeter display 118.

The electronic non-linear aircraft altimeter display 118 comprises a processing unit 112 and a display unit 114.

Still in this first embodiment of the invention, the processing unit 112 is an air data computer, which is well known to someone versed in the art, while the display unit 114 is either an Electronic Flight Instrument System (EFIS), a Multifunction Display (MFD), or a Head-Up Display (HUD), all of which are well known to someone versed in the art.

The processing unit 112 receives a selected display algorithm signal and an altitude reference signal provided by the user interface 110 and a measured altitude signal provided by the altitude measuring device 116.

The processing unit 112 provides an altitude display signal to the display unit 114.

Figure 10:
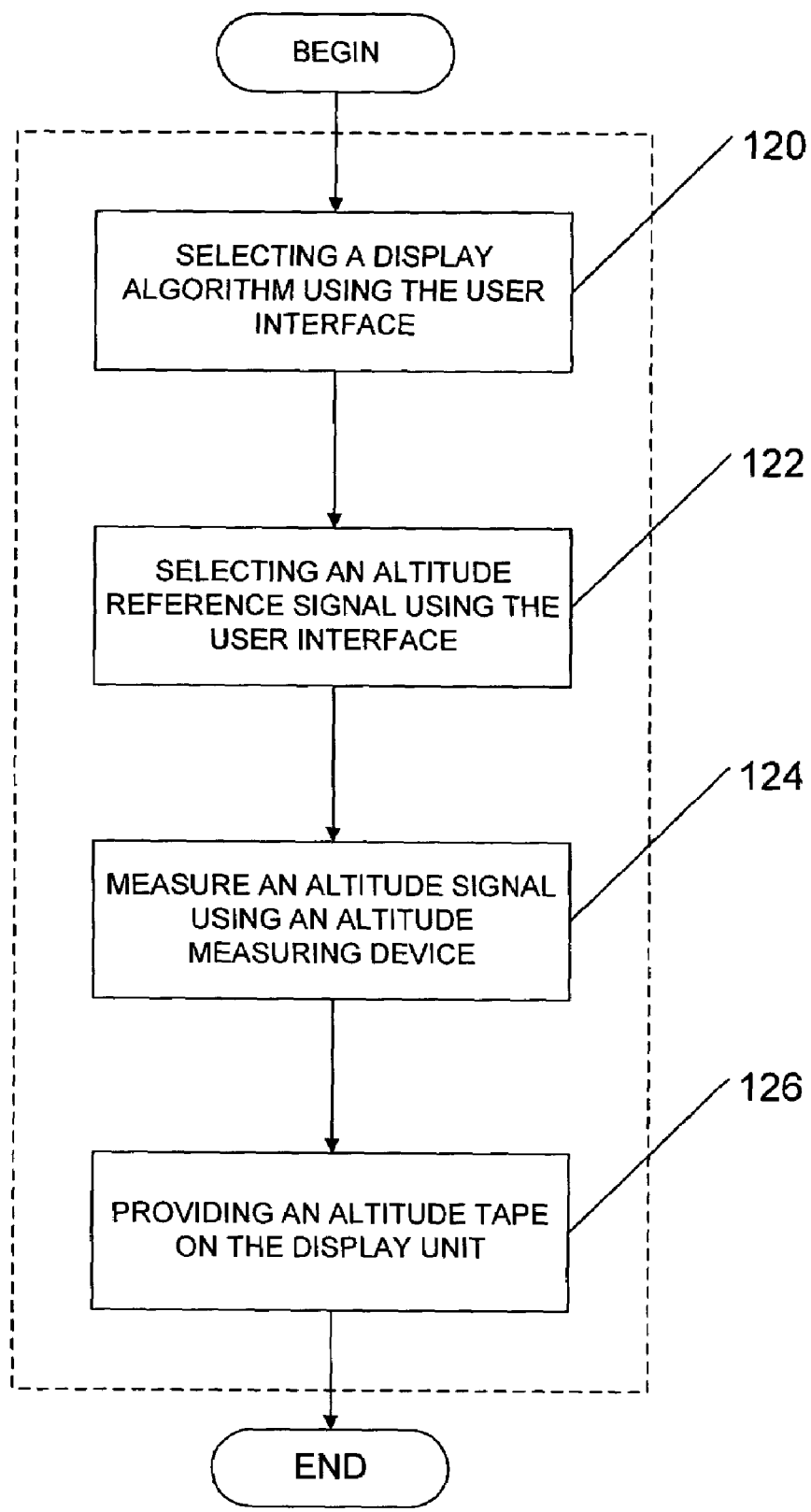
FIG. 10 is a flowchart which shows how the electronic non-linear aircraft dynamic parameter display operates in the first embodiment of the invention where the dynamic parameter is altitude.

Now referring to FIG. 10, there is shown how the electronic non-linear aircraft altimeter display 118 operates in the preferred embodiment of the invention.

According to step 120, a display algorithm is selected using the user interface 110. The selected display algorithm signal is provided by the user interface 110 to the processing unit 112. In one embodiment, the display algorithm is selected by a pilot of the aircraft while in another embodiment of the invention, the display algorithm is selected by the air data or display computer, or the like. For simple embodiments, the display algorithm may be a fixed algorithm which is not user-selectable.

According to step 122, an altitude reference signal is selected using the user interface 110. The selected altitude reference signal is provided by the user interface 110 to the processing unit 112. In one embodiment, the altitude reference signal is selected by a pilot of the aircraft while in the preferred embodiment of the invention, the altitude reference signal is provided by the air data computer or the like. The altitude reference signal typically represents a datum altimeter setting expressed in millibars, inches of Mercury, or as an altitude value in feet or meters.

According to step 124, an altitude signal is measured using the altitude measuring device 116 which provides the measured altitude signal to the processing unit 112.

According to step 126, the altitude display signal, comprising an altitude tape is provided on the display unit 114. The altitude tape is provided by first determining the altitude display signal using the measured altitude signal, the selected altitude reference signal and the selected display algorithm signal and providing the created altitude display signal to the display unit 114.

Figure 11:
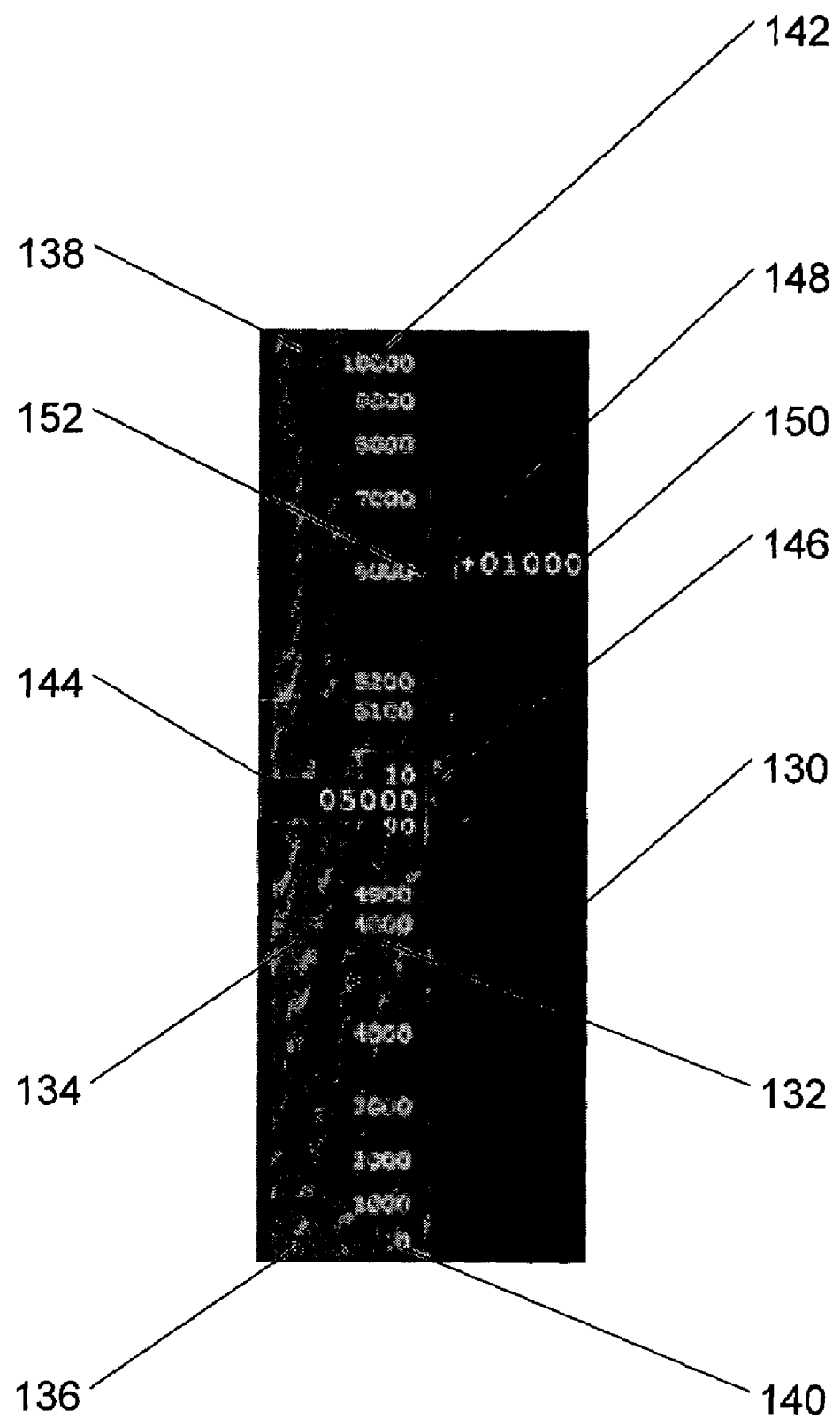
FIG. 11 is a picture which shows a first example of the electronic non-linear aircraft dynamic parameter display in the first embodiment of the invention where the dynamic parameter is altitude.

Now referring to FIG. 11, there is shown a first example of an altitude tape 130 provided on an electronic non-linear aircraft altitude display.

The altitude tape 130 comprises a dynamic non-linear altitude scale 134, a corresponding non-linear altitude value scale 132, a pointer 144, an adjacent vertical bar 146 and an indication of an altitude variation with respect to a predetermined amount of time 150.

By convention, the dynamic non-linear altitude scale 134 and the corresponding non-linear altitude value scale 132 are displayed vertically. In an alternative embodiment, the dynamic non-linear altitude scale 134 and the corresponding non-linear altitude value scale 132 may be displayed horizontally.

The dynamic non-linear altitude scale 134 comprises an altitude scale that is provided between a first altitude scale end 136 and a second altitude scale end 138.

The corresponding non-linear altitude value scale 132 comprises a plurality of corresponding altitude values and is provided between a first altitude value 140 corresponding to the first altitude scale end 136 and a second altitude value 142 corresponding to the second altitude scale end 138.

The pointer 144 is located substantially in the middle of the dynamic non-linear altitude scale 134. The pointer 144 comprises an indication of the measured altitude signal. In this example, the measured altitude signal is 5000 ft.

The adjacent vertical bar 146 is located adjacent on the corresponding non-linear altitude value scale 132. Alternatively, the adjacent vertical bar 146 is located adjacent on the dynamic non-linear altitude scale 134.

The adjacent vertical bar 146 comprises a variable end 148 which is adjacent to a corresponding future altitude value 152. The adjacent vertical bar 146 is expandable between the measured altitude signal and the variable end 148. The adjacent vertical bar 146 therefore provides an indication of a future altitude value if a current variation of the altitude is maintained during a predetermined amount of time. The adjacent vertical bar 146 further comprises the indication of an altitude variation with respect to a predetermined amount of time 150.

In the preferred embodiment, the predetermined amount of time is 1 min. In this example, the indication of an altitude variation with respect to a predetermined amount of time 150 is 1000 ft/min. Still in this example, the corresponding future altitude value 152 is 6000 ft.

The skilled addressee will appreciate that the corresponding future altitude value 152 can easily be seen by a pilot of the aircraft looking at the variable end 148.

It will be appreciated that the dynamic non-linear altitude scale 134 is adapted according to the selected display algorithm signal.

In fact, the dynamic non-linear altitude scale 134 is constantly adapted according to various principles detailed below.

A first principle is the fact that the dynamic non-linear altitude scale 134 is substantially centered on the measured altitude signal. It will be appreciated by someone skilled in the art that this first principle enables a proper presentation of altitude information to the pilot of the aircraft.

A second principle is the fact that, preferably, the first altitude value 140 represents the altimeter setting datum. The altimeter setting datum may be the mean sea level in one embodiment. In another embodiment, the altimeter setting datum may be a standard pressure datum (29.92 inch of mercury). In another embodiment, the altimeter datum may be the surface itself in the case where the altitude measuring device 118 is a radar altimeter or radio altimetry device. The altimeter setting datum may be manually set or obtained from the air data computer or radar altimeter.

A third principle relates to the fact that the dynamic non-linear altitude scale 134 is scaled using the selected display algorithm signal in order to fit both the measured altitude signal and the altimeter setting datum 140 in the available display space.

In one embodiment, the selected display algorithm signal is an exponential factor. In another embodiment of the invention, the selected display algorithm signal is a logarithmic factor. In another alternative embodiment, the selected display algorithm signal is a geometric factor. In a preferred embodiment, the selected display algorithm signal is set so that the scale of the dynamic non-linear altitude scale 134 decreases as it diverges from a current altitude; i.e., the highest resolution in the dynamic non-linear altitude scale 134 is observed immediately adjacent to the measured altitude signal of the aircraft.

The choice of a geometric factor, a logarithmic factor, an exponential factor or any other non-linear selected display algorithm signal may depend on a desired application and a desired altitude display range.

A fourth principles relates to the fact that above the measured altitude signal, the dynamic non-linear altitude scale 134 is scaled by a similar geometric factor, logarithmic factor, exponential factor or any other non-linear selected display algorithm signal to the second altitude value 142. Because of the relative greater significance of altitudes below the aircraft, it is possible to adapt an upper scaling factor to show a smaller altitude scale above the measured altitude signal than below the measured altitude signal. It will be appreciated that as per the third principle, the selected display algorithm signal may also be changed automatically.

Someone skilled in the art will appreciate that the high resolution is located where it is most important to maintain an accurate altitude in order to comply, for instance, with air traffic controller (ATC) clearances; and simultaneously, a clear graphic indication of the aircraft's relationship to the first altitude value 140 is given.

As mentioned previously, it will be appreciated that while a first part of the dynamic non-linear altitude scale 134, for instance, the part above the pointer 144, is adapted according to a first selected display algorithm signal, a second part of the dynamic non-linear altitude scale 134, for instance, the part below the pointer 144 may be adapted according to a second selected display algorithm signal.

Figure 12:
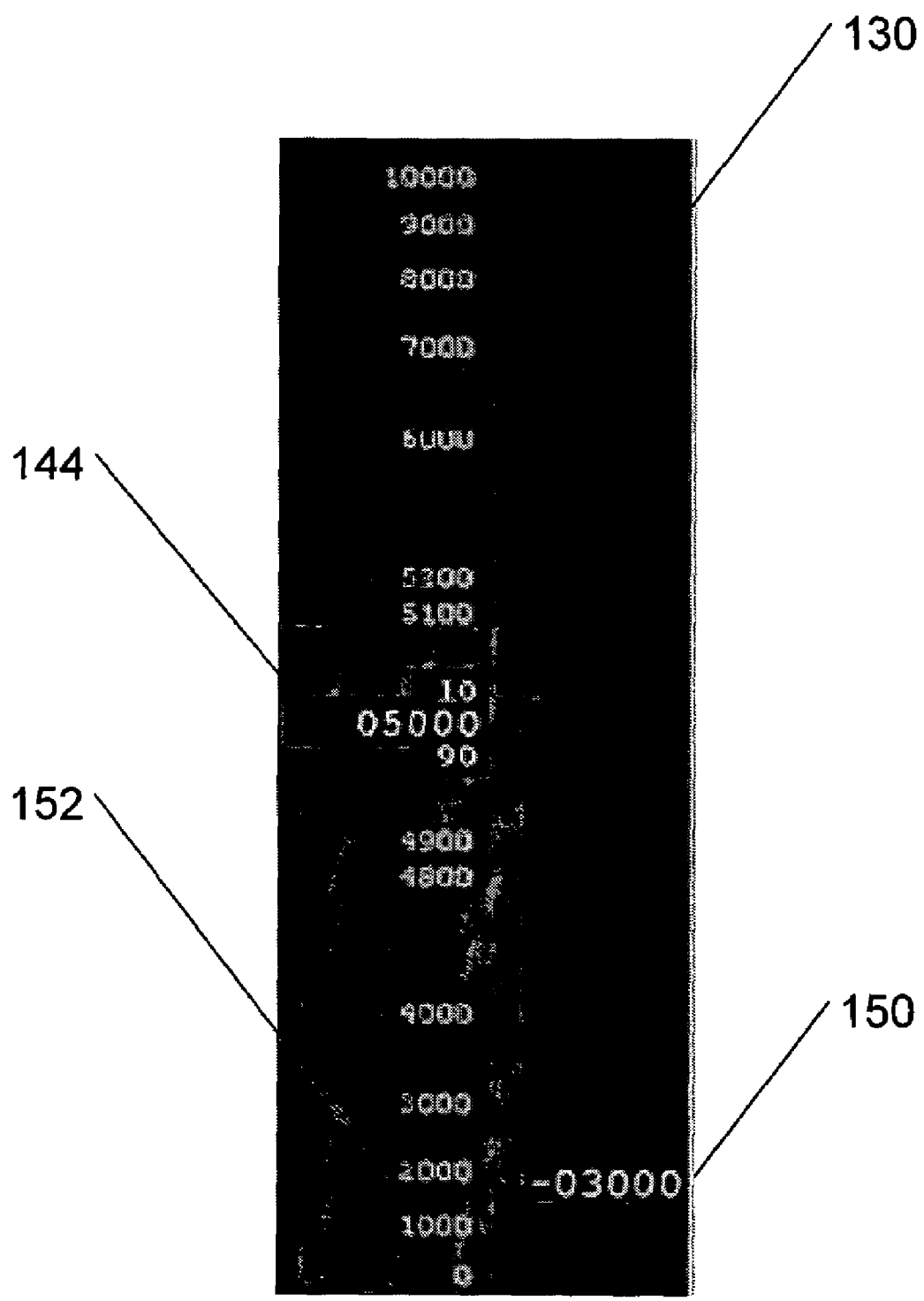
FIG. 12 is a picture which shows a second example of the electronic non-linear aircraft dynamic parameter display in the first embodiment of the invention where the dynamic parameter is altitude.

Now referring to FIG. 12, there is shown a second example of the altitude tape 130 provided on an electronic non-linear aircraft altitude display.

In this example, the pointer 144 displays a measured altitude signal of 5000 ft.

Still in this example, the indication of an altitude variation with respect to a predetermined amount of time 150 is −3000 ft/min and the corresponding future altitude value 152 will be 2000 ft if the aircraft maintains its rate of descent.

It will further be appreciated that the dynamic non-linear altitude scale 134 is constantly adapted according to the display algorithm signal in order to emphasize a range of altitude; such constant adaptation enables the pilot of the aircraft to have a good appreciation of the dynamics of the aircraft; more precisely, the skilled addressee will appreciate that in the case of a descent, the dynamic non-linear speed scale 134 increases as there is less altitude in order to "fit" into the available display area. This results in increasing resolution where it is most necessary which is at low altitudes.

As a corollary, for a given rate of climb or descent, the dynamic non-linear speed scale 134 will move more rapidly at low altitudes than at high altitudes, because the scale factor is greater in the former case. This has a beneficial effect of highlighting high descent rates at low altitudes by giving them greater saliency.

While it may be argued that the adjacent vertical bar is analogous to existing vertical speed indicator (VSI), it will be appreciated that prior art vertical speed indicators are incapable of showing very high rates of change while maintaining adequate resolution for normal operations. Accordingly, it is not unusual for contemporary vertical speed indicators to be "pegged" particularly during high-speed descents, so the pilot has little idea of the actual descent rate and its relationship with current altitude, particularly for high performance aircraft. This is unfortunately also the case with prior art vertical speed indicator displays which incorporate digital readouts, because the determination of "time-to-impact" still requires a mental division of the measured altitude signal (which is changing very rapidly) by the instantaneous vertical speed indicator reading.

The mental division is usually an impossible task under dynamic conditions with a high workload.

The skilled addressee will appreciate that such shortcoming is not possible with the present invention since the only time when vertical speed indicator will be "pegged" will be when ground impact is in less than 1 min.

In such case, the imminent impact will be obvious, and the digital readout 150 will still provide the required rate information to the pilot.

It will further be appreciated that a further benefit of such embodiment of the altitude tape 130 is that the pilot may easily achieve the ideal asymptotic level-off at a desired altitude simply by adjusting the rate of climb or descent to anchor the variable end 58 to the desired level-off altitude. Used in this manner, the constant adaptation of the dynamic non-linear altitude scale 134 has the effect of gradually reducing the rate of climb or descent to zero as the difference between the required and current measured altitude signal diminishes.

Figure 13:
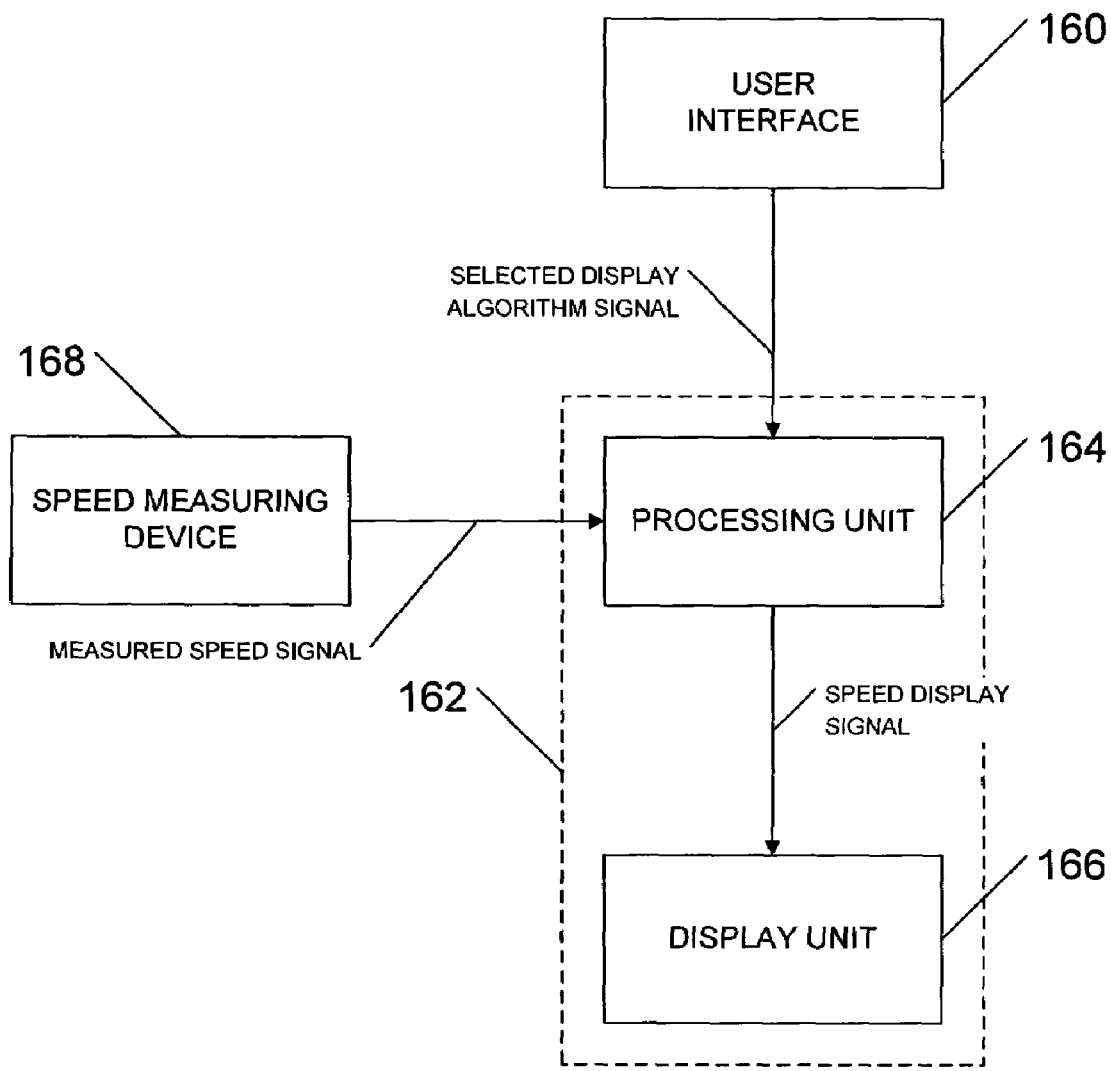
FIG. 13 is a block diagram which shows a second embodiment of the electronic non-linear aircraft dynamic parameter display where the dynamic parameter is speed.

Now referring to FIG. 13, there is shown a block diagram which shows a second embodiment of the invention where the electronic non-linear aircraft dynamic parameter display is an electronic non-linear aircraft speed display 162.

The electronic non-linear aircraft speed display 162 comprises a processing unit 164 and a display unit 166.

Still in this first embodiment of the invention, the processing unit 164 is an air data computer, which is well known to one versed in the art, while the display unit 166 is an airspeed display on an electronic Flight Instrumentation System (EFIS), a multifunction Display (MFD), or a Head-Up Display (HUD), all of which are well known to one versed in the art.

The processing unit 164 receives a selected display algorithm signal provided by the user interface 160 and a measured speed signal provided by the speed measuring device 168.

The processing unit 164 provides a speed display signal to the display unit 166.

Figure 14:
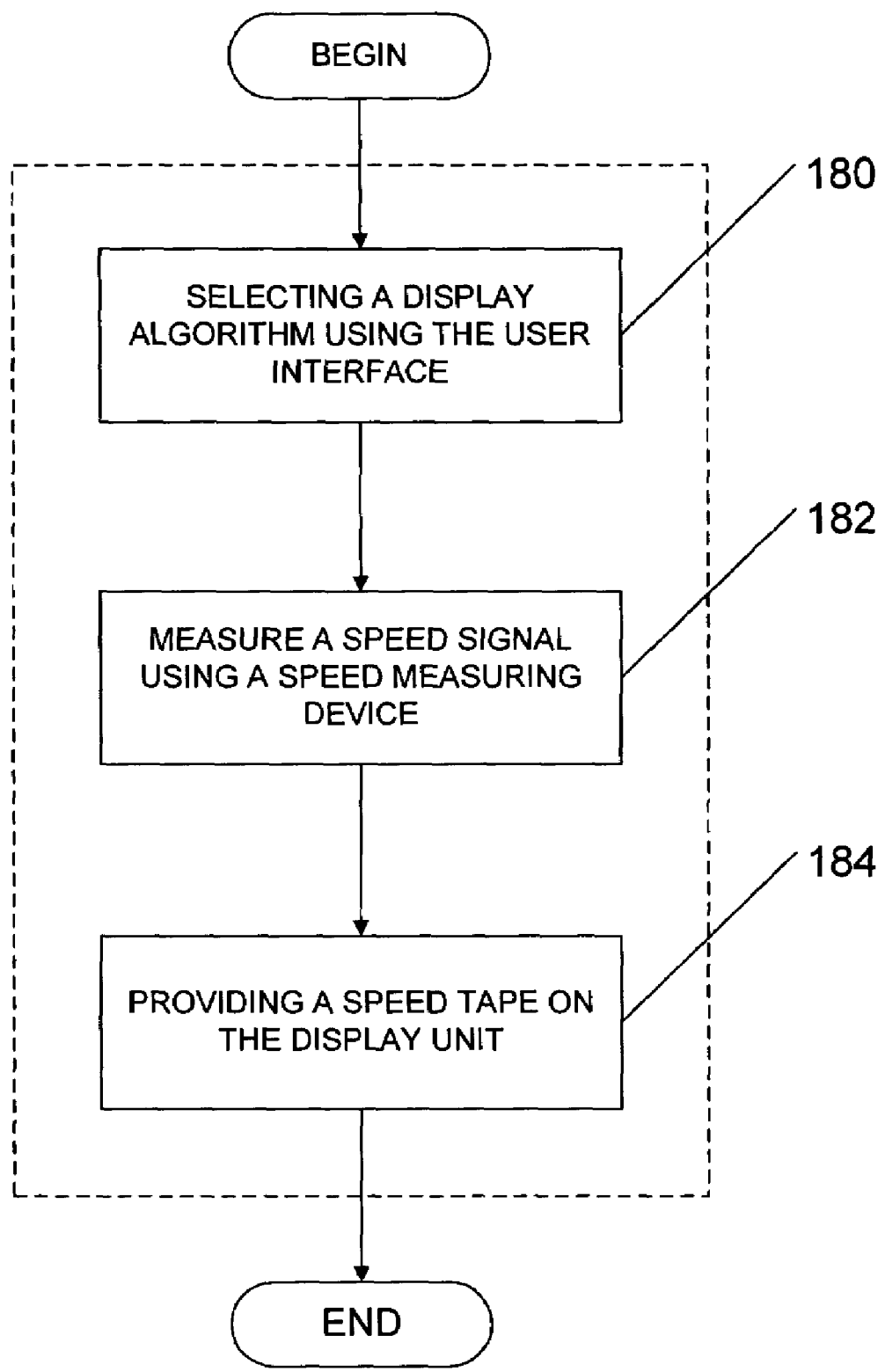
FIG. 14 is a flowchart which shows how the electronic non-linear aircraft dynamic parameter display operates in the second embodiment of the invention where the dynamic parameter is speed.

Now referring to FIG. 14, there is shown how the electronic non-linear aircraft speed display 162 operates in the preferred embodiment of the invention.

According to step 180, a display algorithm is selected using the user interface 160. The selected display algorithm signal is provided by the user interface 160 to the processing unit 164. In one embodiment, the display algorithm is selected by the pilot of the aircraft while in another embodiment of the invention, the display algorithm is selected by the air data computer or the like.

According to step 182, a speed signal is measured using the speed measuring device 168 which provides the measured speed signal to the processing unit 164.

According to step 184, a speed display signal, comprising a speed tape is provided on the display unit 166. The speed tape is provided by first determining the speed display signal using the measured speed signal and the selected display algorithm signal and providing the created speed display signal to the display unit 166.

Figure 15:
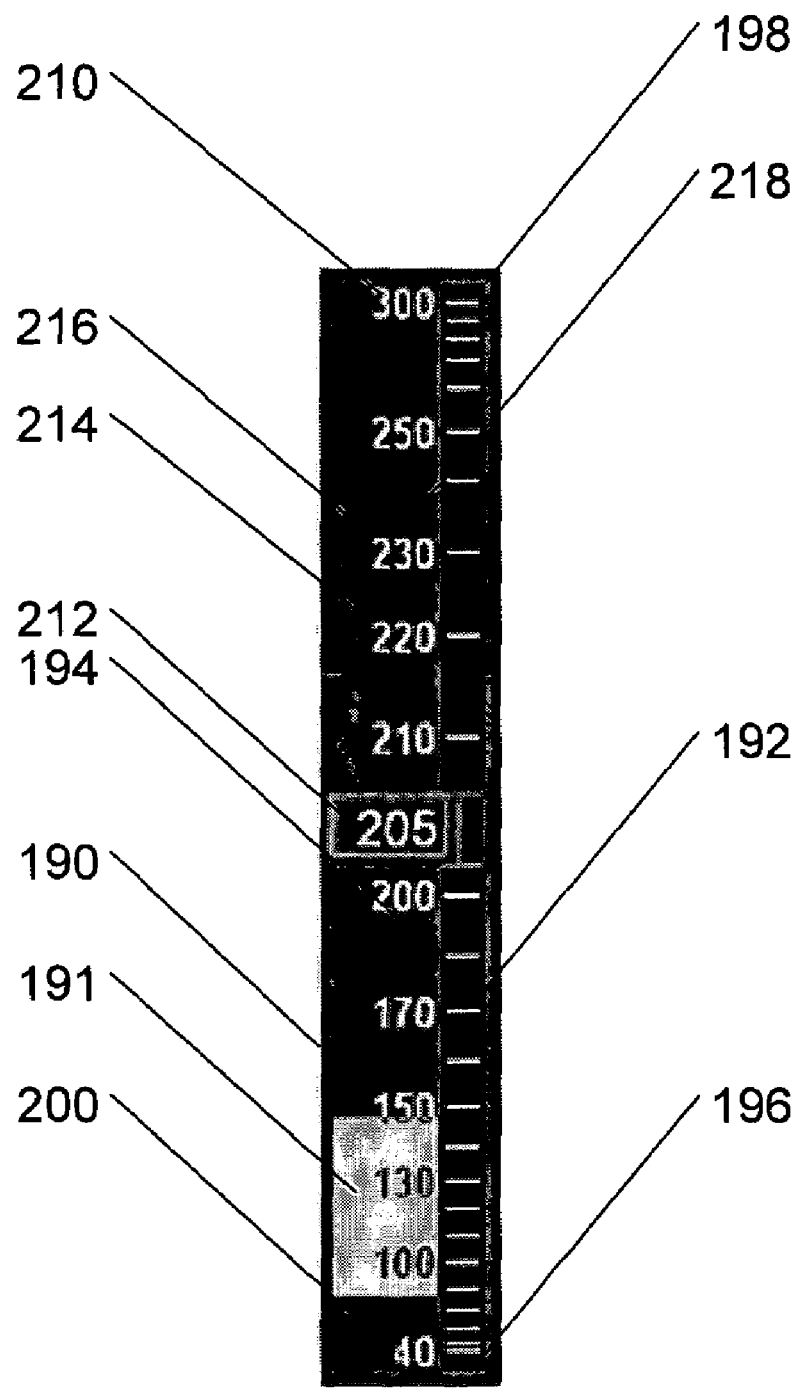
FIG. 15 is a picture which shows an example of the electronic non-linear aircraft dynamic parameter display in the second embodiment of the invention where the dynamic parameter is speed.

Now referring to FIG. 15, there is shown an example of a speed tape 190 provided on an electronic non-linear aircraft dynamic parameter display.

The speed tape 190 comprises a dynamic non-linear speed scale 192, a corresponding non-linear speed value scale 194, a pointer 212 and an adjacent vertical bar 214.

Preferably, the dynamic non-linear speed scale 192 and the corresponding non-linear speed value scale 194 are displayed vertically.

The dynamic non-linear speed scale 192 comprises a speed scale that is provided between a first speed scale end 196 and a second speed scale end 198.

The corresponding non-linear speed value scale 194 comprises a plurality of corresponding speed values and is provided between a first speed value 200 corresponding to the first speed scale end 196 and a second speed value 210 corresponding to the second speed scale end 210.

The pointer 212 is located substantially in the middle of the dynamic non-linear speed scale 192. The pointer 212 comprises an indication of the measured speed signal.

The adjacent vertical bar 214 is located adjacent to the corresponding non-linear speed value scale 194. Alternatively, the adjacent vertical bar 214 is located adjacent to the dynamic non-linear speed scale 192.

The adjacent vertical bar 214 comprises a variable end 216 which is adjacent to a corresponding future speed value 218. The adjacent vertical bar 214 therefore provides an indication of a future speed value if a current variation of the speed is maintained during a predetermined amount of time. In a preferred embodiment, the predetermined amount of time is 10 sec.

The skilled addressee will appreciate that the corresponding future speed value 218 can easily be seen by the pilot of the aircraft looking at the variable end 216.

It will be appreciated that the dynamic non-linear speed scale 192 is constantly adapted according to the selected display algorithm signal. In one embodiment, the selected display algorithm signal is an exponential factor, in another embodiment of the invention, the selected display algorithm signal is a logarithmic factor; in another alternative embodiment, the selected display algorithm signal is a geometric factor.

In fact, the selected algorithm is set so that the highest resolution is observed immediately adjacent to the measured speed signal.

Furthermore, it will be appreciated that while a first part of the dynamic non-linear speed scale 192 is adapted according to a first selected display algorithm signal, a second part of the dynamic non-linear speed scale 192 may be adapted according to a second selected display algorithm signal.

In one embodiment, the first speed value 200 corresponding to the first speed scale end 196 and the second speed value 210 corresponding to the second speed scale end 198 are provided by the user interface 160 while in the preferred embodiment, the first speed value 200 and the second speed value 210 are automatically selected by the air data computer. It will be appreciated that the first speed value 200 and the second speed value 210 may be selected according to the design of the aircraft.

In this example, the measured speed signal is 205 kts.

It will be appreciated that alternatively, the speed tape 190 comprises an indication of characteristic speeds of the aircraft such as Vfe, VNe, Vg, V1, Vr, etc.

Furthermore speed zones such as the "yellow arc", the "green arc" and the "white arc" may be added on the speed tape 190. The skilled addressee will appreciate that the "white arc" 191 is shown on the speed tape 190 disclosed in FIG. 15.

It will be appreciated by the one skilled in the art that the embodiment enables the scale of the dynamic non-linear speed scale 192 to be maximum in the vicinity of the measured speed signal.

Furthermore, the corresponding first speed value 200 and the corresponding second speed value 210 are always displayed on the speed tape 190.

Moreover, as the aircraft approaches low or high airspeed, where most limitations are encountered, the dynamic non-linear speed scale 192 ensures good legibility in these critical regimes.

As per the embodiment where the dynamic parameter is altitude, it will be appreciated that the adjacent vertical bar 214 is of great advantage to show very high rate of change without exceeding available display.

While prior art trend vectors may be "pegged", the embodiment disclosed therein overcome such shortcoming which is of great advantage in the case of military jets.

While it has been disclosed the dynamic parameter may be one of speed and altitude, the skilled addressee will appreciate that the dynamic parameter may alternatively be one of rotations per minutes (RPM), oil pressure, oil temperature, fuel flow, tachometer, remaining fuel or the like.

The embodiments of the invention described above are intended to be exemplary only. The scope of the invention is therefore intended to be limited solely by the scope of the appended claims.

I claim:

1. An apparatus for displaying a dynamic parameter of an aircraft, said apparatus comprising:
    a processing unit receiving a selected display algorithm signal and a reading of said dynamic parameter, said processing unit determining a display signal; and
    a display unit receiving said display signal and displaying a scale having scale ends, said scale changing dynamically and non-linearly in accordance with the selected display algorithm together with a minimum dynamic parameter value and a maximum dynamic parameter value, said display unit further displaying a pointer pointing to said scale in accordance with said reading of said dynamic parameter, such that said selected display algorithm constantly and exactly fits said reading, and the minimum and maximum dynamic parameter values to said scale, thereby emphasizing a range of said reading of said dynamic parameter while keeping said minimum and said maximum dynamic parameter values constantly and in view at respective scale ends.

2. The apparatus as claimed in claim 1, further wherein said scale comprises a vertical portion displayed vertically by said display unit.

3. The apparatus as claimed in claim 2, wherein said dynamic parameter comprises the speed of said aircraft.

4. The apparatus as claimed in claim 3, wherein said display unit displays said pointer with said speed of said aircraft.

5. The apparatus as claimed in claim 4, wherein said scale, displayed by said display unit, is extended between a low speed value and a high speed value, further wherein a plurality of corresponding speed values are displayed adjacently to said scale by said display unit.

6. The apparatus as claimed in claim 4, wherein said display unit further displays an adjacent bar to said scale, said adjacent bar comprising a first end corresponding to said speed of the aircraft and a variable end corresponding, on said scale, to a future speed to be reached by said aircraft if a current variation of said speed is maintained during a predetermined amount of time.

7. The apparatus as claimed in claim 6, wherein said display unit further displays a value indicative of said variation of said speed.

8. The apparatus as claimed in claim 6, wherein said predetermined amount of time is 10 seconds.

9. The apparatus as claimed in claim 3, further comprising a user interface providing said selected display algorithm signal.

10. The apparatus as claimed in claim 2, wherein said dynamic parameter comprises the altitude of said aircraft; further wherein an altitude reference signal is further provided to said processing unit, further wherein said processing unit determines said display signal using said altitude reference signal.

11. The apparatus as claimed in claim 10, wherein said display unit displays said pointer with said altitude of said aircraft.

12. The apparatus as claimed in claim 11, wherein said scale, displayed by said display unit, is extended between a reference altitude level value, corresponding to said altitude reference signal, and a high altitude value, further wherein a plurality of corresponding altitude values are displayed, by said display unit, adjacently to said scale.

13. The apparatus as claimed in claim 10, further comprising a user interface providing said selected display algorithm signal and said altitude reference signal.

14. The apparatus as claimed in claim 10, wherein said display unit further displays an adjacent bar to said scale, said adjacent bar comprising a first end corresponding to said altitude of said aircraft and a variable end corresponding, on said scale, to a future altitude to be reached by said aircraft if a current variation of said altitude is maintained during a predetermined amount of time.

15. The apparatus as claimed in claim 14, wherein said display unit further displays a value indicative of said variation of said altitude.

16. The apparatus as claimed in claim 15, wherein said predetermined amount of time is 60 seconds.

17. The apparatus as claimed in claim 1, wherein said scale, displayed by said display unit, is extended between a low dynamic parameter value and a high dynamic parameter value, further wherein a plurality of corresponding dynamic parameter values are displayed adjacently to said scale by said display unit.

18. A method for displaying a dynamic parameter of an aircraft, said method comprising:
    providing a reading of said dynamic parameter;
    generating a scale having scale ends, said scale changing dynamically and non-linearly using said provided reading of said dynamic parameter and a selected display algorithm signal together with a minimum dynamic parameter value and a maximum dynamic parameter value, and a pointer pointing to said scale in accordance with said reading of said dynamic parameter of said aircraft; and
    displaying said scale, said minimum dynamic parameter value and said maximum dynamic parameter value, such that said selected display algorithm constantly and exactly fits said reading, and the minimum and maximum dynamic parameter value's to said scale, thereby emphasizing a range of said reading of said dynamic parameter while keeping said minimum and said maximum dynamic parameter values constant and in view at respective scale ends.

19. The method as claimed in claim 18, further comprising generating a plurality of corresponding dynamic parameter values, corresponding to said scale, further comprising displaying said plurality of corresponding dynamic parameter values adjacently to said scale.

20. The method as claimed in claim 18, further comprising selecting said selected display algorithm signal from a plurality of non-linear display algorithms.

21. The method as claimed in claim 20, wherein said plurality of non-linear display algorithms comprise a geometric-based algorithm, an exponential-based algorithm, a logarithm-based algorithm or the like.

22. The method as claimed in claim 18, wherein said generating of said scale is performed using said provided reading of said dynamic parameter and more than one selected display algorithm signal, each of the more than one selected display algorithm signal being used for generating a corresponding part of said scale.

23. The method as claimed in claim 18, further comprising generating an adjacent bar, said adjacent bar comprising a first end corresponding to said dynamic parameter of said aircraft and a variable end corresponding to a future dynamic parameter value of said aircraft, if a current variation of said dynamic parameter is maintained during a predetermined amount of time, further comprising displaying said adjacent bar adjacently to said scale.

24. The method as claimed in claim 23, wherein said displaying of said adjacent bar further comprises displaying a value of said current variation of said dynamic parameter.

25. The method as claimed in claim 18, wherein said dynamic parameter comprises at least one of altitude, speed, rotations per minutes (RPM), oil pressure, oil temperature, engine temperature, fuel flow, tachometer and remaining fuel.

26. An apparatus for displaying a dynamic parameter of an aircraft, said apparatus comprising:
a display unit receiving a display signal and displaying a scale having scale ends, said scale changing dynamically and non-linearly, such that a selected algorithm constantly and exactly fits a reading, a minimum dynamic parameter value and a maximum dynamic parameter value, said display until further displaying a pointer pointing to said scale in accordance with said reading of said dynamic parameter, thereby emphasizing a range of said reading of said dynamic parameter while keeping said minimum and said maximum parameter value constant and in view at respective scale ends.

* * * * *